Nov. 8, 1938.  E. T. FERNGREN  2,136,185
METHOD AND AUTOMATIC DEVICE FOR HANDLING FLUENT
PLASTIC MATERIAL IN DIPPING MACHINES
Original Filed Sept. 12, 1932  7 Sheets-Sheet 1

Fig. 1.

INVENTOR
Enoch T. Ferngren

Nov. 8, 1938.　　　　E. T. FERNGREN　　　2,136,185
METHOD AND AUTOMATIC DEVICE FOR HANDLING FLUENT
PLASTIC MATERIAL IN DIPPING MACHINES
Original Filed Sept. 12, 1932　　7 Sheets-Sheet 4

FIG. 6.

INVENTOR
Enoch T. Ferngren

Nov. 8, 1938.  E. T. FERNGREN  2,136,185
METHOD AND AUTOMATIC DEVICE FOR HANDLING FLUENT
PLASTIC MATERIAL IN DIPPING MACHINES
Original Filed Sept. 12, 1932  7 Sheets-Sheet 5

INVENTOR

Enoch T. Ferngren

Fig. 8

Patented Nov. 8, 1938

2,136,185

UNITED STATES PATENT OFFICE 2,136,185

METHOD AND AUTOMATIC DEVICE FOR HANDLING FLUENT PLASTIC MATERIAL IN DIPPING MACHINES

Enoch T. Ferngren, Jackson Heights, N. Y., assignor, by mesne assignments, to Plax Corporation, Hartford, Conn., a corporation of Delaware Continuation of application Serial No. 632,689, September 12, 1932. This application October 15, 1936, Serial No. 105,718

17 Claims. (Cl. 18—24)

This invention relates to methods and apparatus for the automatic handling and presenting of fluid material to dipping tools, molds or forms for the forming of films thereon, or film objects, and for the coating of articles by initially fluid material, and also more particularly for presenting fluid plastic material from which articles, including film articles, may be made. The invention also comprehends the handling and presenting of such fluid materials as lacquers, paints and enamels for use in coating the surfaces of articles.

An important use of the methods and apparatus of my present invention is in the manufacture by automatic dipping of articles, such as milk bottle caps, bags and the like, which may be formed with relatively thin walls by one or more dipping operations from plastic materials, such as cellulose derivatives, the forming being effected, for example, by dipping a suitable tool into the fluid material and thereafter removing the film article from the tool. Such a process is disclosed in my copending application Serial No. 629,697, filed August 20, 1932.

I also contemplate that the methods and apparatus herein described and claimed may be used in the handling of latex or other dispersions of rubber or other substances in suitable solvents or fluid dispersing media.

I contemplate that the methods and apparatus of my present invention may be employed in the handling of fluid materials at any desired or necessary temperatures according to the characteristics of the material being used.

The present application is a refiled application which is being substituted for my application, Serial No. 632,689 filed September 12, 1932.

Among the objects of the present invention is to provide methods and apparatus of the character generally set forth for the automatic handling of fluid materials and for the presentation of such material in a manner that articles, molds or forms may be dipped thereinto as a part of a substantially continuous process.

A further object of the present invention is to provide methods and apparatus of the character set forth for maintaining fluid material at desired conditions for handling and for forming the articles or films which are to be made therefrom, including the homogenizing of the material, the maintenance of a desired temperature thereof, the prevention of undue evaporation of any solvents which may be used therewith, and the maintenance of the fluid material free of air or gas bubbles, so that coatings made therefrom will be uniform in quantity and quality.

A further object of the present invention is to provide a method of applying fluid material as aforesaid to the end that articles or films formed therefrom may be produced rapidly and uniformly. Among the more specific objects of the invention are:

(1) To provide automatic apparatus and methods by which fluid material may be supplied continuously or intermittently as may be desired to moving pools, which are used successively to contact with one or more forms, molds or articles to be dipped into the fluid material, while maintaining the fluid material in each of the pools at the desired temperature and at the desired level in the container for the pool, and preventing so far as practicable contact of the outside air with the surface layers of the fluid material in the pools to prevent the formation of skin on such surface layers and to reduce to a minimum the evaporation of any solvents that may be used with the fluid material being employed.

(2) To provide apparatus and methods by which individual pools of plastic material may be caused to move substantially continuously in an orbital path, including a portion in which articles, forms or molds may be dipped in or coated with the solution while traveling in coincidence with the pools and preferably also at the same time to provide for the circulation of the fluid material into and/or out of dipping pools during the dipping operations of the molds or forms, so as substantially continuously to bring fresh homogeneous material into contact with the articles, molds or forms during the dipping operation.

(3) To provide for the variation in the level of the liquid in the several pools during the orbital bodily movement of those pools as may be desired, so that, for example, the dipping operation may be carried on by the rapid flooding of the articles, forms or molds to be dipped, or to provide for the lowering of the level of the material in a pool during a part of the time an article, mold or form is being dipped thereinto, and thus to provide for selected operations in dipping as may be desired for different types of fluid materials being employed and/or for the making of different types of articles.

Other more specific objects of the present invention will appear from a detailed description of one embodiment thereof and will be pointed out in the appended claims.

While I contemplate that apparatus constructed in accordance with my invention and included in the scope of the appended claims may be built in many different forms, I have chosen for purposes of illustration to disclose an apparatus in which a series of relatively long and narrow supply tanks for holding pools of fluid material are supported and conveyed through an orbital path by a ferris-wheel like device. The tanks are suspended from the outer ends of hollow tubular arms or spokes which are rotated preferably continuously to move the tanks along an orbital path, an upper portion of which is maintained substantially horizontal by means hereinafter described, so that molds or other articles may be dipped into the tanks during the horizontal portion of their orbital path of movement. There is also provided means by which fluid material may be supplied to and withdrawn from each of the tanks at any time or zone of their movement, and substantially independently of that movement.

Referring now to the drawings, and particularly to Figs. 1, 6, 7 and 8, there is provided a plurality of tanks 1, each of which is similar to the others, so that but one need be described.

Figure 7:
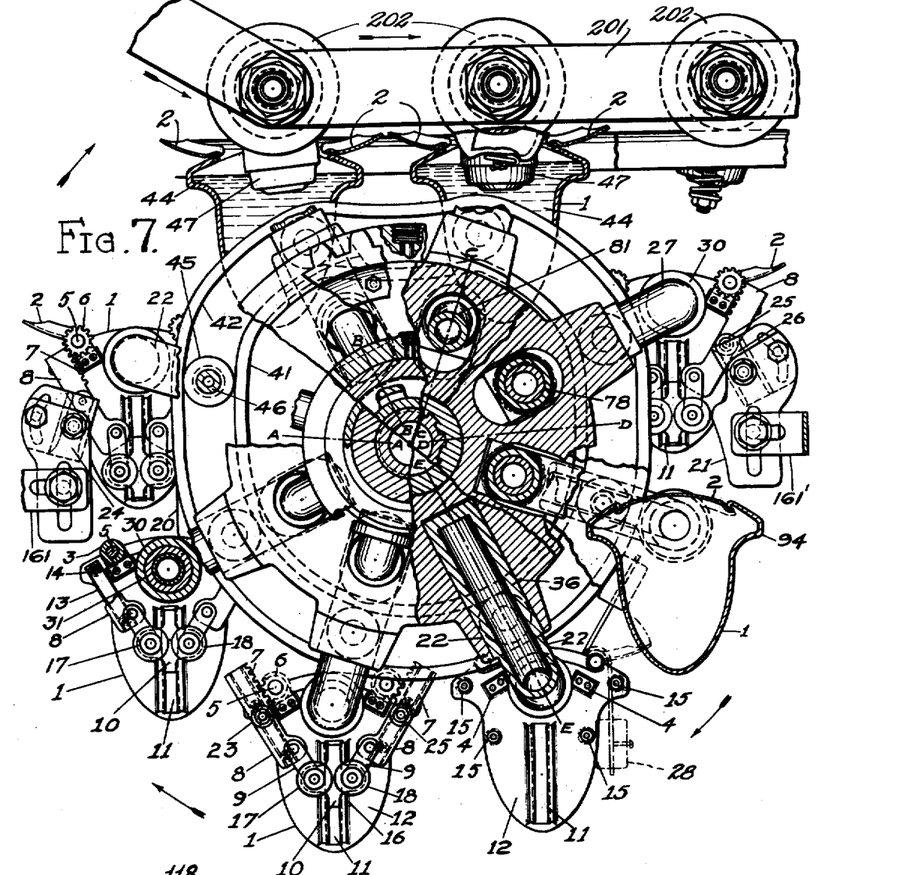
Fig. 7 is a composite view, partly in end elevation and with other parts in transverse vertical section, the sections being taken on the lines A—A, B—B, C—C, D—D and E—E of Fig. 6 at the zones correspondingly lettered in Fig. 7.

Each of the tanks 1 is provided with a pair of mating covers 2, which are pivotally supported in bearings 3 formed in brackets attached to the ends of the tank as shown at 4 (Fig. 7). One pintle 5 of each of the covers 2 carries a pinion 6 at its outer end. The two pinions 6 at the end of each tank are in mesh with racks 7, which are formed on the upper portions of diagonally slidable bars 8. The lower ends of the bars 8 are connected by links 9 to a vertical sliding member 10, which is received in or upon a suitable guide means 11 formed on or secured to an end wall 12 of the tank 1. The inclined bars 8 may be guided for movement in straight lines in respect to the end 12 of the associated tank by guide strips 13 engaging in dovetailed grooves in the bars 8. The strips 13 may be secured to the end wall 12 of the tank or by other suitable means.

The vertical sliding member 10 has formed thereon a cross arm 16 which carries rollers 17 and 18, these rollers serving to guide the tanks during portions of their orbital path of movement by engaging stationary cam surfaces 20 and 21 (Fig. 7) as hereinafter set forth.

As seen in Fig. 7, the tanks 1 are moved through their path in a clockwise direction by means hereinafter to be described. During the raising of the tanks at the left, as shown in Fig. 7, it is desired that the covers 2 be opened to expose the fluid material within the tanks for the dipping operation. For this purpose, the slide bar 8 at the left as seen in Fig. 7 is provided with a cam roller 23, which is moved by the movements of the tank through an inclined cam slot 24, the latter being formed in a bracket adjustably secured by a bracket 161 in a fixed position to some stationary part of the machine at 162 (see Fig. 1). This causes the opening of both cover members due to the mechanical interconnection thereof through the links 9 and the vertical slide member 10. During this cover opening operation the roller 18 is traveling along the vertical stationary cam surface 20 to steady the tank.

Figure 1:
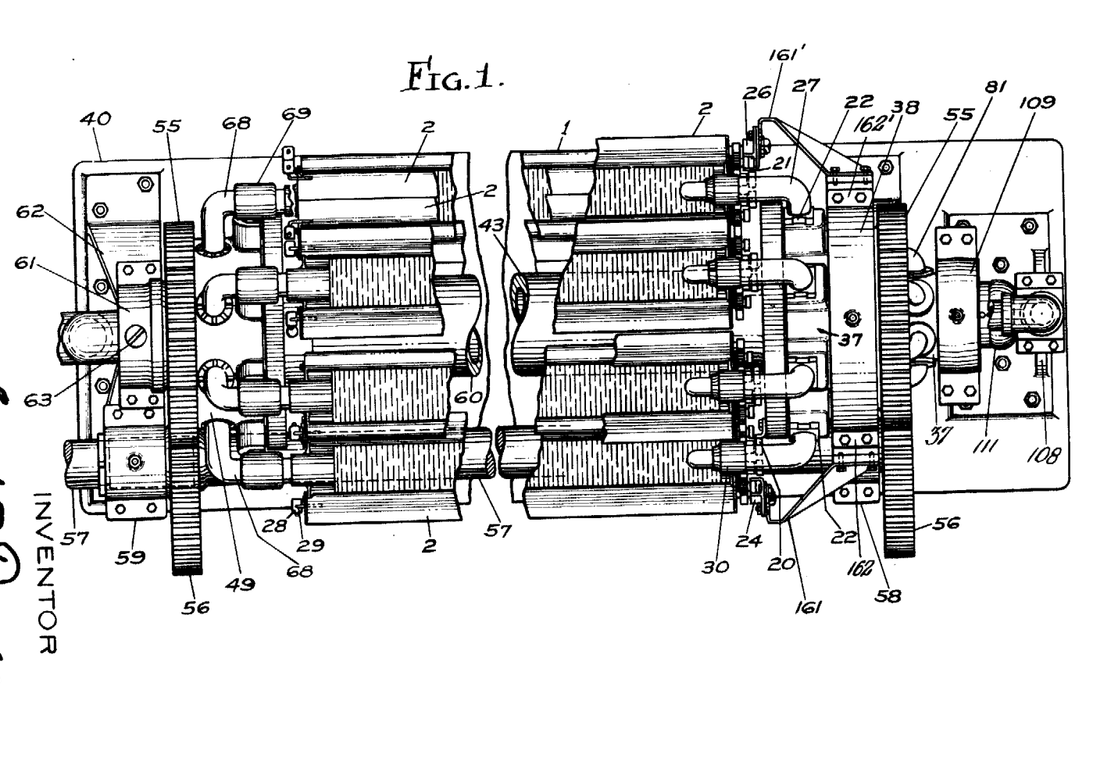
Fig. 1 is a view in plan of a machine embodying my invention with a part at the center broken out.
Figures 2, 3:
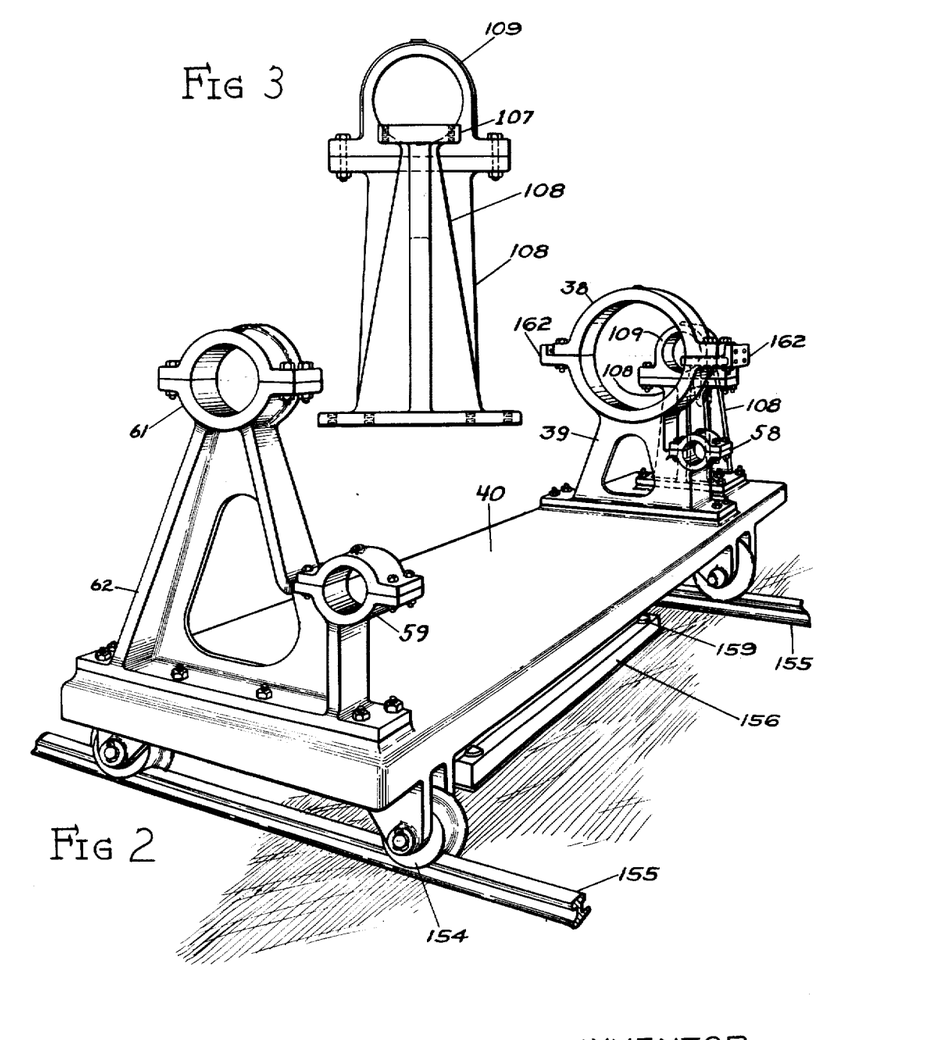
Fig. 2 is a perspective view of the supporting structure and base of the machine shown in Fig. 1.
Fig. 3 is an end elevation, as seen from the right in Fig. 1, of one of the supports.

After the dipping operation, it is desired that the covers 2 be closed, which is accomplished during the lowering of the tanks, as seen at the right in Fig. 7, by the engagement of a cam roller 25 on the inclined slide bar 8 shown at the right in this figure with a cam slot 26. The cam slot 26 is similarly formed in a bracket which is adjustably secured by a bracket 161' to another stationary part of the machine as shown at 162' (Figs. 1, 2 and 7). During this time the cam roll 18 engages against the stationary surface 21 and steadies the tank.

In order suitably to aid in the opening and closing movement of the covers 2, the weight of the covers and their associate operating mechanism may be counterbalanced by weights 28 (Fig. 8), which may be located at the opposite end, of the tank from the mechanisms just described, these weights preferably being adjustably mounted on angularly extending rods 29 suitably secured to each of the cover members 2 or extended from the pintle shafts 5 thereof at the left hand end of the tank as seen in Fig. 1.

The cover arrangement just described serves to minimize the exposure of the fluid material in the tanks 1 at times other than that during which the dipping tools or other implements are associated therewith, and thus minimizes the loss of solvents, and tends to prevent changes in consistency or undue loss of heat, and possible detrimental action of light or atmosphere upon the surface of the fluid material being used, as well as serving to prevent to a large extent the ingress of dust to the fluid material.

I have shown the end walls 34 of the tanks 1 formed with hollow chambers 35, which may be used for containing insulation as indicated by the legend on the drawings or for the circulation of heating or cooling media, as may be desired or necessary in view of the character of the material being used in the device. It is further contemplated that the body portions of the tanks 1 may also be provided with suitable insulation or with jacketing chambers (not shown) should it be desirable. Inasmuch, however, as the use of insulation and temperature controlling jackets is common in many arts, it is not further disclosed here.

The right hand ends of the several tanks, as seen in Fig. 1 are pivotally supported at the ends of hollow arms 22, which are arranged in a substantially radial manner, and serve not only to support and move the tanks, but also as conduits for the supplying of the fluid material thereto from a central common source, as hereinafter to be described. The fluid material may be supplied (Fig. 6) through the hollow arms 22 and through tubular extensions 27 of these arms into the tanks 1 through down-turned spouts 33, one of these spouts being rigidly associated with each tank. The joints between the tanks and the extensions 27 of the arms 22 are formed to provide substantially fluid-tight seals while permitting the relative rotation of the tanks in respect to the extensions 27 under the influence of gravity. For this purpose, tubular extensions 32 are formed rigid with the tanks and extending into the end portions 31 of the extensions 27. These end portions 31 are received in annular sockets formed between the extensions 32 and concentric cup-shaped hub portions 30 as shown.

The hollow arms 22 are supported in and carried by a rotatable housing 37, these arms being radially slidable in respect thereto in guideways 36 formed in said housing. The housing 37 is mounted for rotation in a split bearing block 38, which forms a part of a support 39 (Figs. 2 and 6) mounted upon a base plate 40.

Radial movement of the arms 22 incident to the non-circular orbital path of the tanks 1 is controlled by a closed cam track 42 formed in a stationary cam plate 41, each of the arms 22 carrying a roller 45, which runs in the cam track 42. As shown, the rollers 45 are secured to the arms 22 by cap screws 46. The cam plate 41 is supported by mounting it upon a stationary shaft extension 43 about which the housing 37 is revolved, this shaft extension being supported at the two ends of the rotatable structure as hereinafter to be described.

Figure 8:
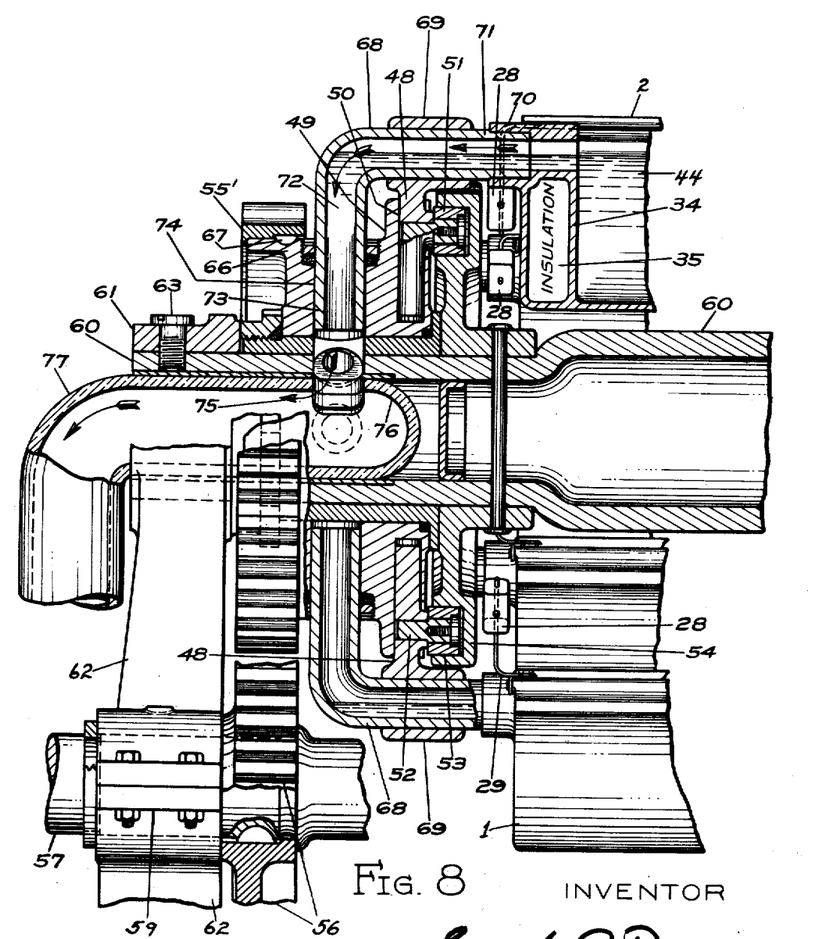
Fig. 8 is a fragmentary view, principally in central vertical section, of the portion of the device shown at the left of Fig. 1.

At the left end of the machine, as seen in Fig. 1, and as shown in detail in Fig. 8, the tanks 1 are rotatably supported as more specifically described hereinafter by a plurality of radially movable arms 48, which are received slidably in radial guideways 50 formed in a rotatable housing 49. Radial movement of the arms 48 in coordination with the radial movement of the arms 22 previously described, is controlled by providing each of the arms with a cam roller 51 suitably mounted upon a stud 52 and traveling in a closed cam track 53 formed in a cam plate 54. The cam plate 54 is suitably secured to a stationary tubular central portion 60 of the machine.

The cam tracks 42 and 53 are so formed as to cause the tanks 1 to travel in an orbital but non-circular path, including for this purpose portions causing two recurring successive outward and inward movements of each of the arms 22 and 48 during each complete revolution of the housings 37 and 49. Thus during the dipping of articles, molds or forms, which takes place during the horizontal movement of the tanks 1, the tanks and the articles, molds or forms, shown for example in Fig. 7 at 47 may be moved in the same direction and at substantially the same speed in parallel paths, to provide a desired condition for dipping. There will thus be no substantial relative movement between the dipping tools and the tanks which would cause a dragging of the tools or forms through the pools 44 of fluid in the tanks 1. I contemplate, for example, that the pools 44 may be approximately 9 inches from center to center during their travel in the horizontal portions of their paths, and that the spacing between successive series of dipping tools 47 will be substantially the same. It will be understood, however, that I do not wish to be limited to the particular spacing between pools here given merely by way of example.

Means are provided for similarly and positively rotating the housing members 37 and 49, so that the tanks 1 will be moved similarly at the two ends thereof. For this purpose the housing 37 has a spur gear 55 secured thereto as by bolts 65 and the housing 49 has secured thereto a similar spur gear 55', the latter being, as shown, a ring gear keyed to an extension 66 of the housing 49 by one or more keys 67. The gears 55 are in mesh with similar gears 56 secured adjacent to the ends of a common driving shaft 57, which is journaled in bearings 58 and 59 on the framework of the machine (Figs. 1 and 2). Any suitable means (not shown) may be employed for driving the shaft 57 either continuously or intermittently as may be desired.

The housing 49 is revolubly mounted about the tubular central shaft portion 60 which is stationary and may be formed integrally with or rigidly secured to the shaft extension 43 previously referred to. The shaft 60 is rigidly secured in a hub portion 61 (Figs. 1, 2 and 8), which is supported by a bracket 62 from the base plate 40. As shown, the shaft member is rigidly locked to the hub 61 by one or more bolts 63.

While the construction at the left hand end of the machine may be substantially the same as that at the right, I have shown the arms 48 as not connected directly with the ends of the tanks and have illustrated angular tubular members 68 rigidly carried by arms 48 in hub extensions 69 thereof, and rotatably connected to the ends of the tanks 1 at substantially fluid-tight joints, as illustrated at 70. These joints as shown include outer cup-shaped portions formed on or rigidly secured to the ends of the tanks 1 in which the ends 71 of the tubular members 68 are projected in a telescoping manner.

The tubular members 68 provide passages 72 through which the fluid material contained in the tanks 1 may flow continuously or intermittently by gravity or by suitable pressure or vacuum pumping means to provide circulation through the pool 44 of the fluid material in each tank. The opposite end 73 of each member 68 is radially slidable in a bore 74 of the housing 49 to accommodate the non-circular path of the tanks 1.

Figure 6:
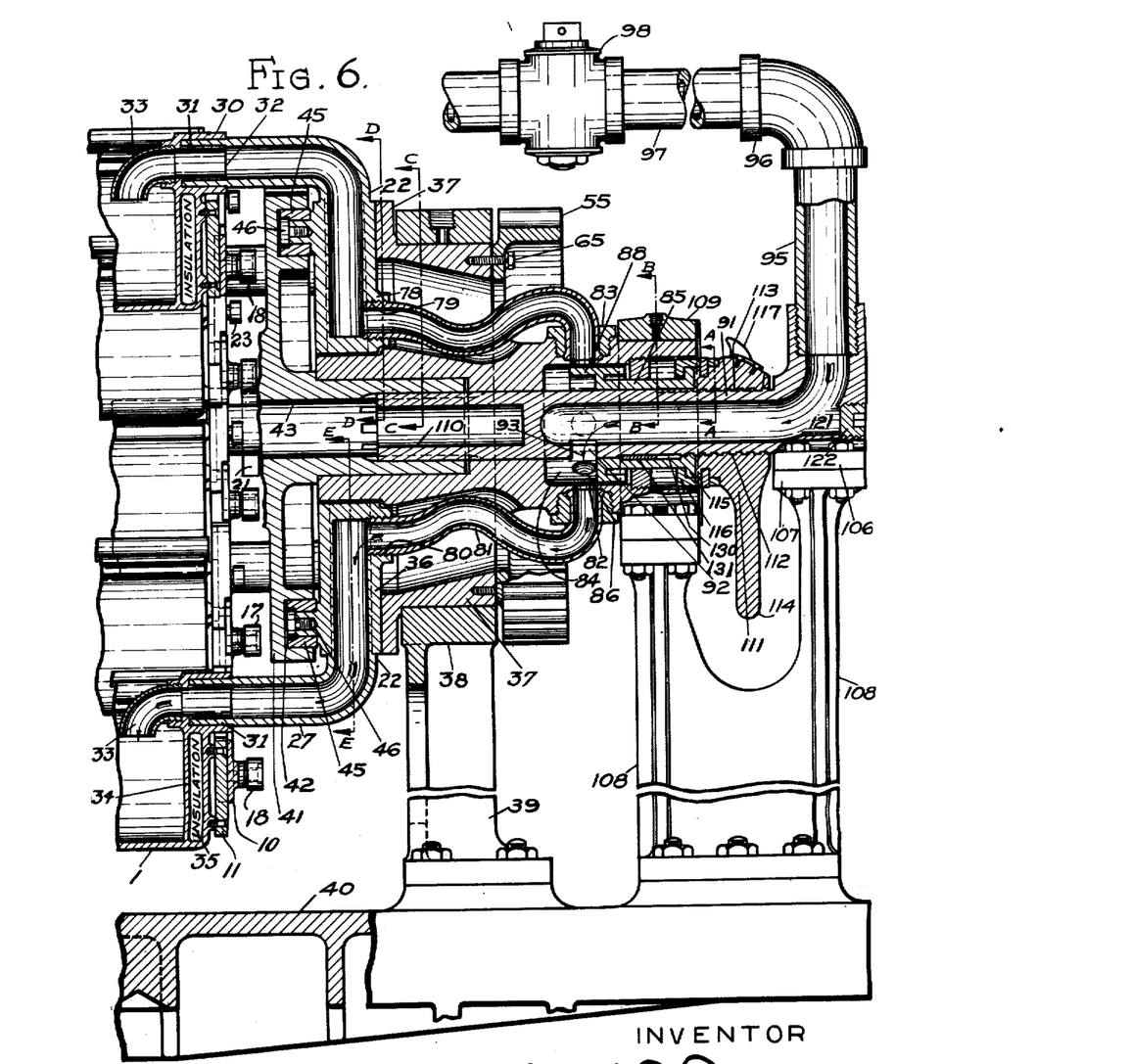
Fig. 6 is a fragmentary view, principally in central vertical section, of the portion of the device shown at the right in Fig. 1.

The bores 74 may communicate with the inside of the hollow shaft 60 at any desired zone or zones around the periphery of the shaft. I have shown this communication merely at an upper zone thereof at which zone the bores 74 come opposite a suitable aperture formed in the shaft 60, which in turn communicates through a registering aperture with the interior of a discharge pipe 77, as shown in Fig. 6.

The inwardly extended end 76 of the pipe 77 is closed, as shown, to prevent loss of the fluid material being circulated as hereinafter described. Thus fluid material flowing from certain of the tanks 1 may pass through the tubular passage 72 of the hollow member 68 and thence, as shown by the arrow 75, into the discharge pipe 77 during the time the bores 74 are opposite the registering apertures in the hollow shaft 60 and pipe 77 respectively. The material passing out of the machine through the pipe 77 may be caused to flow back to a suitably collecting tank, from which the material may again be recirculated, as desired and as hereinafter more fully set forth.

The radial inner end 78 of each of the arms 22 (Figs. 6 and 7) is provided with an internally threaded aperture 79 in which is secured the threaded end 80 of a flexible tube 81 which may be of suitable material. The tubes 81 may be formed as generally indicated in Fig. 6, or may be arranged in a substantially helical manner extending part way around the axis of the housing 37. The flexible character of the tubes 81 permits the radial movement of the arms 22 as above described. Each of the tubes 81 may have its other end 82 secured in the housing 37 by the use of a nipple member 83, as shown. I also contemplate that, if desired, a suitable ball and socket joint may be employed at this point for use with relatively non-flexible connecting tubes corresponding to the tubes 81. The several tubes 81 communicate through radial bores 86 in the adjacent portion of the housing 37 with a chamber 84 therein.

Means are provided for controlling the flow of fluid material from the chamber 84 through the several tubes 81 to the tanks 1. For this purpose there is located within the chamber 84 an annular valve member 85, which is arranged for axial adjustive movement on the outside of a stationary central hollow shaft 91. Axial adjustment of the valve member 85 will serve to mask to a desired extent port openings 86 and thereby to control the flow of fluid into and through the pipes 81 to the tanks 1.

As it is often desired that fluid be supplied to the tanks 1 during their travel through a part only of their orbital path, i. e., to each tank during its movement through a predetermined angular zone in its path, it is desired that means be provided to prevent flow of fluid to the tanks 1 except when the tanks are in a desired zone in their path. For this purpose the valve 85 is provided with a semi-cylindrical segmental sleeve portion 88, which serves entirely or partly to obstruct some of the port openings 86, while leaving others free to conduct fluid to their associated tanks. Thus with the device constructed as shown, the tanks will be successively supplied with fluid during their travel through a selected portion only of their path of movement. As shown in Fig. 6, the fluid material may be fed only towards the tanks during their passage through the lower part of their orbit. By adjustably rotating the valve 85 including the sleeve portion 88 in respect to the axis of the machine, the zone during which the tanks 1 are supplied with fluid may be varied to suit the requirements of a particular installation or operation. The valve 85 is normally splined to the shaft 91 by a key 131 located in a groove 130, but may be angularly adjusted by removing the key, rotating the valve to a new desired angular position and reinserting the key. There are for this purpose a plurality of grooves 130 in either the valve or the shaft 91 or both.

The central hollow shaft 91, which serves to conduct the fluid material to the cavity 84, is provided as shown in Fig. 6, with but one opening 92 through which the fluid material may flow as indicated by the arrow 93. It is to be understood, however, that as many openings similar to that shown at 92 as may be desired may be provided.

Figures 9, 10:
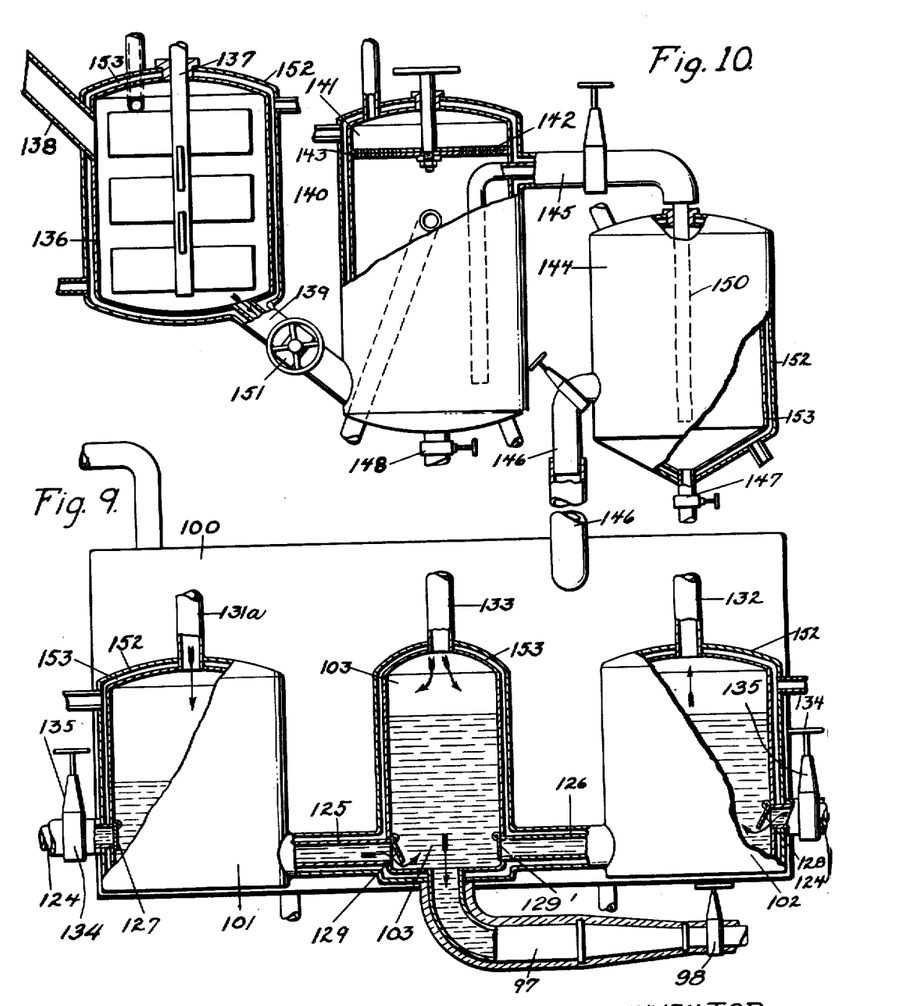
Fig. 9 is a diagrammatic view, partly in elevation and partly in vertical section, showing certain supply tanks and associated mechanism which may be used for supplying fluid to the machine of Fig. 1.
Fig. 10 is a diagrammatic view, partly in elevation and partly in vertical section, of a series of tanks which may be used in the preparation of the fluid material for use with the structure shown in the other figures.

The fluid material being supplied to the machine is conducted thereto through a pipe 97, an angle pipe 96 and a pipe 95 to the hollow pipe 91 under control of a valve shown at 98, and from a suitable supply system which may be as illustrated in Fig. 9 and which will later be described.

The center pipe or hollow shaft 91 (Fig. 6) may be formed integrally with a supporting flange 106, which is shown as bolted to a complementary flange 107 (Figs. 2, 3 and 6) on a supporting bracket 108 which is in turn carried by the base 40. The bracket 108 also carries a hub portion 109 (Figs. 3 and 6) which serves as a bearing for the right-hand end of the housing 37. The hollow shaft 91 is rigidly associated with the shaft extension 43, which in turn may be rigid or integral with the hollow shaft 60 (Fig. 8), there being preferably a splined connection as shown between an extension 110 of the hollow shaft 91 and the shaft extension 43.

Means are provided for axially moving the valve 85 to control the flow of fluid to the several tanks from the chamber 84. For this purpose there is provided a member 111, internally threaded as shown at 112, which cooperates with the threads 113 formed on the outside of the hollow shaft 91. The member 111 is provided with a handle 114 by which it may be rotated. The right-hand end portion of the valve member 85 is provided with an outwardly extending flange 115 adjacent to the member 111. Secured to the member 111 and overlapping the flange 115 is a housing 116, thus insuring translatory or axial movement of the valve member 85 when the member 111 is rotated, while permitting relative rotation between the members 111 and 85. The member 111 is preferably provided with an index pointer 117 by which the adjustment of the valve 85 may be ascertained by comparison with an index plate or series of markings generally indicated at 118 formed on or secured to the end of the bearing 109.

Suitable clean-out openings may be provided at selected points along the fluid conduits, one of which is indicated at 121 (Fig. 6) and is shown closed by a plug 122. Such clean-out openings are desirable in a device of this character, especially when the apparatus is to be used at different times for different types of fluid material.

From the foregoing description the normal and possible operations of the machine proper will be obvious. With the machine set up as above described, power may be supplied either continuously or intermittently as desired to rotate the shaft 57, thus moving all the tanks through their orbital non-circular path. The upper portion of this path is substantially horizontal due to the configuration of the cam tracks 42 and 53, the arms 22 and 48 moving radially into and out of their bearings or sockets for this purpose. The tanks are rotatably supported at their opposite ends about a common horizontal axis individual to each tank, and are normally maintained in suspended relation with respect to this axis by gravity. Special means are, however, provided as above set forth for steadying the tanks and maintaining them vertical during the time the covers 2 thereof are being cammed open or shut. Means are provided for introducing fluid into the several tanks during the rotation of the supports as a whole and during the movement of the tanks, this fluid being introduced through the pipe 97, and thence through the parts, chambers or passages numbered 96, 95, 91, 92, 84, 82, 81, 22, 27, and 33 into the tanks and thence out through parts or passages 71, 72, 73 and 77.

It will be understood further that by suitable arrangement of the parts, the tanks may be partially or wholly drained and replaced with fresh material during each complete revolution and also that material may be moved into and through the tanks either continuously or intermittently, so as to provide a desired type of dipping, including the flooding of the tanks during the dipping operation. It is also contemplated as above generally referred to that the fluid material may be forced into or forcibly withdrawn from the several tanks at desired times or zones in their orbital path of movement, either by the use of continuous streams at practically constant pressure or by pulsating streams.

Thus the fluid material may be presented for use at the proper condition and homogeneity, thus preventing setting or jelling of certain types of material which it may be desired to use in the tanks or preventing precipitation therefrom.

Furthermore it is possible by a suitable arrangement of valves and supply and exhaust means to cause flow of the fluid material in either direction or alternately in both directions, and either continuously or intermittently.

While I contemplate that any desired type of supply system may be employed for supplying the fluid material to the machine previously described, I have shown in Fig. 9 a system which may be employed with satisfactory results. As shown in this figure, there is provided a main supply tank 100 and three associated chambers 101, 102 and 103. As shown, the chambers 101 and 102 are similar each to the other, and are both connected through pipes 124 with the tank 100 (the latter connection not being shown in detail). The chambers 101 and 102 communicate with the chamber 103 through passages 125 and 126 respectively, and the chamber 103 communicates through the passage 97 (see also Fig. 6) with the dipping machine just described. In each of the pipes 124 there are provided valves shown at 134 and 135 and in each of the chambers 101 and 102 there is provided a one-way valve so arranged as to permit the flow of fluid from the main supply tank 100 into these chambers, but to prevent reverse flow. These latter valves are shown respectively at 127 and 128 for chambers 101 and 102. In the chambers 103 there are also provided similar one way valves associated with the passages or pipes 125 and 126 these valves being indicated respectively at 129 and 129', and serving to permit flow into the chamber 103, but to prevent flow therefrom through these pipes. Associated with the chambers 101, 102 and 103 are pipes 131ª, 132 and 133 respectively leading to suitable sources of vacuum and/or pressure.

Thus when it is desired to force fluid from the chamber 103 to the machine, pressure may be admitted to the top of the chamber through pipe 133, which under certain circumstances at least will maintain valves 129 and 130 closed. However, it is normally contemplated that chamber 103 will serve as a main discharge chamber and that it will contain at all times a certain fairly definite amount of fluid. When, therefore, it is desired that fluid be supplied to the machine, it will normally be supplied alternately from the chambers 101 and 102. As shown in Fig. 9 fluid is being supplied through pipe 125 from chamber 101 under the influence of pneumatic pressure admitted to the chamber through pipe 131ª, this pressure retaining the valve 127 closed and valve 129 open. The pressure under which the material is being supplied to the machine can be controlled by the pressure maintained within the chamber 103.

When chamber 101 has been sufficiently emptied, as aforesaid, the pressure at the top of this chamber through pipe 131ª may be reduced and/or a vacuum may be applied at this point and continued flow of fluid material to the machine may be supplied from the chamber 102. This will permit valve 129 to close under the influence of the pressure within chamber 103. In case a vacuum is created in chamber 101 to fill it, the valve 127 will open to permit the influx of material through the pipe 124 and the valve 134. This is the condition taking place, as shown in Fig. 9, for chamber 102. Thus chambers 100 and 102 will be alternately emptied and filled from the main supply tank 100, it being understood that while one of these chambers is being filled, the other will be supplying fluid to the machine. Furthermore if a pulsating flow is desired, this may be set up by control of pressure within the chamber 103. I also contemplate that such a pulsating flow could be provided in timed relation with the movement or operation of the dipping machine heretofore described.

While any desired means may be provided for the mixing or other preparation of fluid material to be used with the machine heretofore described, I have illustrated in Fig. 10, a series of tanks, including a mixing tank 136 provided with a rotary agitator 137 and an inlet chute 138, a tank 140 communicating with the tank 136 through a passage 139 under control of a valve 151 and a tank 144 communicating with the tank 140 through a syphon pipe 145, 150. In the tank 140 material may be vacuum or pressure treated as may be required and may also be subjected to other desired treatments. The tank 140 is provided with an upper compartment 141 and with perforated valve and wall portions 142 and 143, providing for desired types of treatment to reduce material to be used to the proper density and composition, after which it may be caused to flow into the tank 144. The tank 144 may function as a supplying tank; and from this tank the material is normally caused to flow to the main supply tank 100 through a conduit shown at 146. The tanks 140 and 144 are further provided with discharge cocks 148 and 147 through which sludge materials may be drained, and by which the tanks may be cleaned. As shown I have also provided that the tube 150 comprising an extension of the syphon pipe 145, may be vertically adjusted in respect to the tank 144 to control the point of discharge of the syphon, within the permissive syphoning limits.

While it may not be necessary in the treatment of all kinds of fluids, it is often desirable that the preparation and storage tanks for fluids which may be used in my machine be controlled as to temperature. For this purpose each of the tanks shown in Figs. 9 and 10 is preferably provided with a double wall jacket in which a temperature controlling medium may be circulated to control the temperature, and hence the viscosity of the material being prepared or stored. I have shown this jacket at 152 and indicated the space between the double walls at 153.

Figures 4, 5:
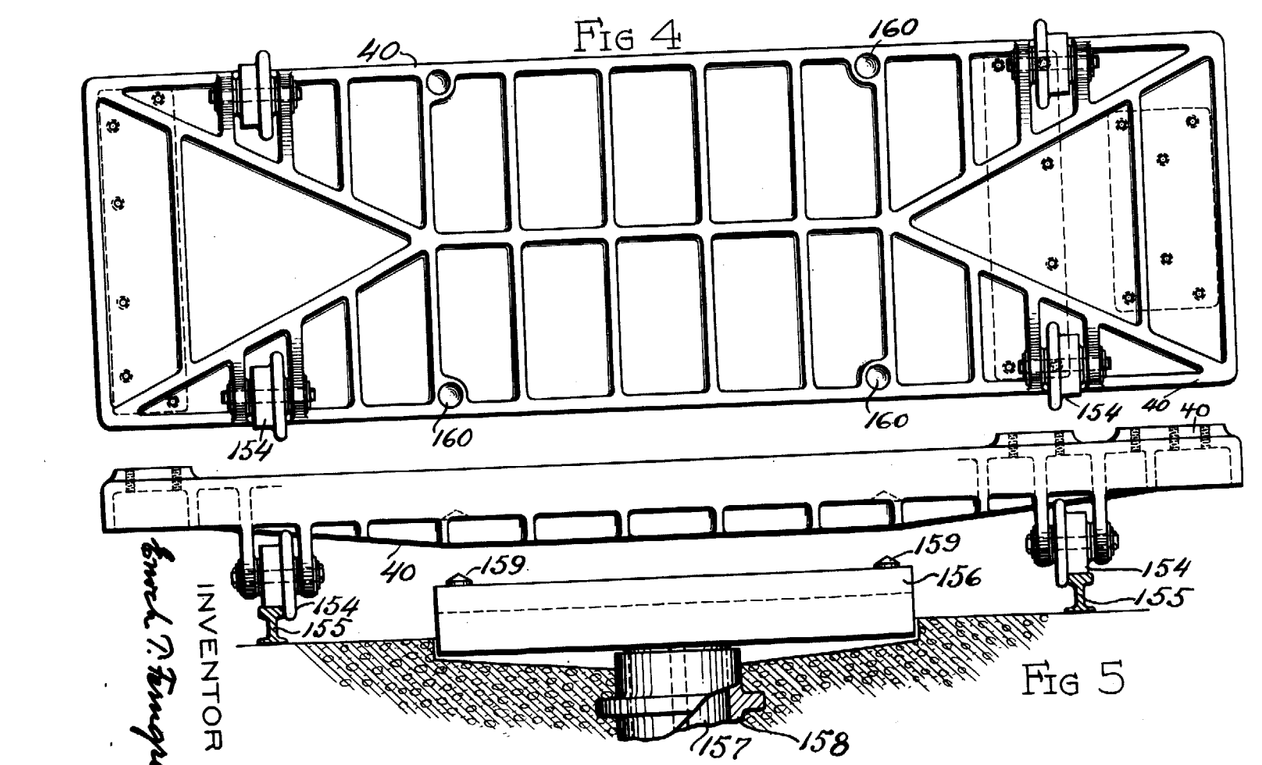
Fig. 4 is a bottom plan view of the base plate for the supporting structure.
Fig. 5 is a view, principally in side elevation, of the base plate positioned above a hydraulic lifting and lowering device.

Under some conditions of operation it may be desirable to supplement the vertical and horizontal movements of the tanks 1 by additional vertical and/or horizontal movements of the entire apparatus, as by raising or lowering the base plate 40 and all parts carried thereby by a suitable means. For this purpose I have illustrated in Figs. 4 and 5 the base plate 40 as provided with wheels 154 running on tracks or rails 155, so that the machine may be moved about as may be required. Furthermore I have illustrated a hydraulic lifting device for lifting the entire machine, comprising a base plate 156 provided with centering stud members 159, which are adapted to engage in suitable recesses 160 formed in the base 40. The base plate 156 is mounted upon the upper end of a hydraulic piston 157 received within a cylinder 158 suitably mounted in masonry or some other construction as shown.

In Fig. 7 I have illustrated the cooperative relation between the machine of my invention and a plurality or series of dipping forms intended to form film-like articles. These forms are shown at 47 and are arranged in a plurality of parallel series, each series being carried by suitable means generally indicated at 202 connected together by links or other means 201, and being supported by suitable guiding means not numbered. These forms are illustrated purely by way of example and per se form no part of the present invention.

While I have shown and described but one embodiment of my invention, it will be understood that many modifications may be made therein and equivalents substituted and further that the invention is not limited to use with any particular type of fluid material, but is of substantially universal application for accomplishing the ends above outlined. I do not wish to be limited therefore, except by the scope of the appended claims, which are to be construed as broadly as the state of the prior art permits.

The present application is a continuation of my copending application, Serial No. 632,689, filed September 12, 1932.

I claim:

1. Apparatus for the coating of articles with film-forming compositions, comprising a container for a pool of a film-forming composition, means for establishing, maintaining and conducting a stream of the film-forming composition from a source of supply to, through and away from a dipping pool in said container, and means for bodily moving said container in a predetermined path in proximity to the path of an article to be dipped, the aforesaid means being so constructed and arranged that the article may be dipped into the pool in said container at the adjacent portion of said paths, said stream maintaining and conducting means being independent of the movement of said container.

2. Apparatus for the coating of articles with film-forming compositions, comprising a series of rows of forms constructed and arranged to be coated while passing along a predetermined path, means for passing a fluid film-forming material in a plurality of streams adjacent to said path, means for moving portions of each stream bodily in an endless path contacting with said forms to one zone in said endless path, whereby successively to contact said streams with said forms row after row, and means for causing flowing movements of said streams of film-forming material during the aforesaid bodily movements thereof.

3. Apparatus according to claim 2, wherein the several means are so constructed and arranged that the streams of coating composition are contacted with said rows of forms while both are passing at substantially the same speed along substantially horizontal portions of said paths.

4. In the coating of articles with film-forming compositions, the process which comprises passing a series of rows of forms to be coated along a predetermined path, passing a fluid film-forming material in a pulsating flow in a plurality of streams adjacent to said path, moving portions of each stream bodily in an endless path contacting with said forms at one zone thereof, and successively contacting said streams with said forms row after row.

5. In the coating of articles with film-forming compositions, the process which comprises passing a series of rows of forms to be coated along a predetermined path, passing a fluid film-forming material in a plurality of streams adjacent to said path, moving portions of each stream bodily in an endless path contacting with said forms at one zone thereof, successively contacting said streams with said forms row after row, flooding each of said streams successively during the period said forms are being dipped thereinto, and partially draining each of said streams before another dipping period.

6. Apparatus for the coating of articles with film-forming material, comprising a form constructed and arranged for movement in a predetermined path, a container for a dipping pool constructed and arranged for movement in a predetermined path, a portion at least of which is adjacent to and in the same direction as a portion of the first-named path and in such relation to the path of said form that the form is dipped into the pool in said container, and means for establishing and maintaining a flowing stream of a film-forming material through said container at least during its passage through the portion of its path adjacent to the path of said form.

7. Apparatus for the coating of articles with film-forming material, comprising a form constructed and arranged for movement in a predetermined path, a container for a dipping pool constructed and arranged for movement in a predetermined path, a portion at least of which is adjacent to and in the same direction as a portion of the first-named path and in such relation to the path of said form that the form is dipped into the pool in said container, a source of supply of film-forming material, and means for establishing and maintaining a continuous circulation of film-forming material from said source of supply to and through said container while it is moving through the portion of its path adjacent to the path of said form.

8. In a coating device, means for moving a series of articles to be coated along a predetermined path at a predetermined speed, a plurality of containers cooperating therewith for holding flowing streams of coating material, means for moving said containers at substantially said predetermined speed through an endless path intercepting said predetermined path at at least one predetermined zone, thereby successively contacting said flowing streams with said articles, and means operating during the movement of said containers for circulating material therethrough to establish and maintain flowing streams of the material therein.

9. Apparatus for holding and transporting pools of plastic material into which horizontally moving articles may be successively dipped and withdrawn, comprising a series of tanks for holding the pools of plastic material, conduit means for supplying plastic material to the tanks at all times during their movement, and means for moving said tanks through an orbital path in such relation adjacent to the horizontal path through which the articles to be dipped are moved during the dipping period that the articles may be immersed to a desired extent in the pools.

10. Apparatus for supplying coatings of plastic material to the exterior surfaces of dipped articles, comprising central fluid-conducting means, a distributing system having conduit parts rotatable around said means, a series of tanks each of which is suspended from one of said conduit parts, and means for forcing fluid plastic material through said fluid-conducting means and the said conduit parts to the said tanks.

11. Apparatus for supplying fluid plastic film-forming material to the exterior of articles to be dipped, comprising a container for the fluid plastic material, a supply body of said material, conduit connections between said container and said supply body, means for moving said container into a dipping position, and means for causing a flow of the plastic material through said container when thus positioned.

12. Apparatus for supplying fluid plastic materials to dipping tanks which are moved in a non-circular orbital path, a portion of which is in the direction of advance of articles to be dipped, comprising a series of tanks, a series of hollow spokes for supporting and moving said tanks about an axis central of said orbital path, a series of hollow flexible tubes respectively associated with said spokes, and means for causing fluid plastic material to traverse said tubes and spokes and to enter and leave said tanks during their movement as aforesaid.

13. In the coating of articles with film-forming compositions, the process which comprises contacting an article to be coated with a coating solution to secure the adherence of a coating thereto, producing a flow-movement of said solution against said article during its contact with said article, causing withdrawal of said article from said solution, draining off the surplus coating solution from said article, and continuously moving both said coating solution and said article in the same direction during said coating and draining operations.

14. Apparatus for supplying fluid plastic material into which articles may be dipped for forming plastic films thereon, comprising a container, means for moving said container in a predetermined path during a portion of which an article may be dipped into fluid plastic material within said container, and means for causing a positive circulation of fluid plastic material into and out of said container at a selected time during the movement thereof in said path.

15. Apparatus for supplying fluid plastic material into which articles may be dipped for forming plastic films thereon, comprising a container, means for continuously moving said container in a predetermined non-circular orbital path during a portion of which an article may be dipped into fluid plastic material within said container, and means for causing a circulation of fluid plastic material into and out of said container during movement thereof and during the time an article is being dipped into the fluid material thereon.

16. Apparatus for supplying fluid plastic material into which articles may be dipped for forming plastic films thereon, comprising a container, means for moving said container in a predetermined path during a portion of which an article may be dipped into fluid plastic material within said container, a supply body of fluid plastic material, and means continuously providing passages for flow of the fluid material from the source thereof into and out of said container independently of the movement of the latter.

17. Apparatus for supplying fluid plastic material into which articles may be dipped for forming plastic films thereon, comprising supporting means rotatable about a horizontal axis, a plurality of open top fluid containers carried by said supporting means and rotatable in respect thereto so that they may always be maintained with their openings right side up, means mounting said containers for movement in substantially radial directions with respect to said rotatable supporting means, means for constraining said containers to movement by said rotatable supporting means in a non-circular orbital path about said horizontal axis, a source of fluid plastic material spaced from all the above-named means, conduit means including a fluid conducting passage-forming means concentric with the axis of rotation of said rotatable supporting means continuously establishing communication between said source of plastic material and each of said containers, and means for rotating said rotatable supporting means and said containers.

ENOCH T. FERNGREN.